US009809698B2

(12) United States Patent
Li et al.

(10) Patent No.: US 9,809,698 B2
(45) Date of Patent: Nov. 7, 2017

(54) ROBUST METHOD FOR PRODUCING LATEX SEED PARTICLES

(71) Applicant: Xerox Corporation, Norwalk, CT (US)

(72) Inventors: Shigeng Li, Penfield, NY (US); Yanjia Zuo, Rochester, NY (US); Chieh-Min Cheng, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 272 days.

(21) Appl. No.: 14/737,440

(22) Filed: Jun. 11, 2015

(65) Prior Publication Data

US 2016/0362538 A1 Dec. 15, 2016

(51) Int. Cl.
*C08K 5/42* (2006.01)
*G03G 9/08* (2006.01)

(52) U.S. Cl.
CPC ............ *C08K 5/42* (2013.01); *G03G 9/0817* (2013.01)

(58) Field of Classification Search
CPC ........................................................ C08K 5/42
See application file for complete search history.

(56) References Cited

U.S. PATENT DOCUMENTS 6,447,974 B1 9/2002 Chen et al.

OTHER PUBLICATIONS ("DOWFAX Anionic Surfactant: Discover the Power of a Unique Disulfonated Structure for the Toughest Applications" by Dow Chemical Company, Jul. 2000.*

* cited by examiner

*Primary Examiner* — Vickey Nerangis

(57) ABSTRACT

A process directed to emulsion polymerization (EP) methods for producing seed particles reproducibly independent of initiator amount and rate of introduction.

19 Claims, No Drawings

ROBUST METHOD FOR PRODUCING LATEX SEED PARTICLES

FIELD

The disclosure is directed to robust emulsion polymerization (EP) methods for producing seed resin for making a latex, which can be used in preparing toner. The robust EP methods provide reproducible production and uniform populations of smaller sized seed particles independent of initiator amount and initiator addition rate.

BACKGROUND

Variation in latex particle size made via emulsion polymerization (EP) methods can be problematic. Beyond out of specification particles due to equipment failure, any of a variety of parameters relating to materials and methods can impact seed particle size, such as, initiator amount and/or initiator addition rate, and hence, resin particle size. As such, variation in particle size negatively impacts downstream processes, uses and costs.

Robust and reproducible processes need to be developed for seed particle production.

SUMMARY

The disclosure is directed emulsion polymerization (EP) methods that reproducibly produce latex seed particles using a branched alkyl diphenyl oxide disulfonate as surfactant, where seed particle size is independent of initiator amount and initiator addition rate.

In embodiments, a method of obtaining seed latex particles of reproducible size independent of initiator amount and initiator addition rate comprises: (a) combining (i) a monomer, (ii) an optional branching agent, (iii) an optional chain transfer agent and (iv) a branched alkyl diphenyl oxide disulfonate in a vessel to form a mixture; (b) charging a portion of the mixture into a second reactor comprising a branched alkyl diphenyl oxide disulfonate; and (c) adding initiator to said reactor comprising said mixture and surfactants of interest over a period not exceeding 7.5 minutes and incubating the mixture to enable said monomer to form seed particles, where seed particle size is substantially independent of initiator amount and initiator feed rate, the seed particles are of smaller size and the population of seed particles is uniform with the majority of particles of the mean population size.

DETAILED DESCRIPTION

While not being bound by theory, final latex particle size can be influenced by seed particle size. As such, control of seed particle size is critical for successful EP of latex particles of certain size for use, for example, in toner.

It is believed during formation of seed particles, amount of and/or addition rate of initiator (e.g., ammonium persulfate (APS)) impacts seed particle size. After a monomer comprising a seed surfactant is dispersed in an aqueous medium in a reactor, where the seed surfactant, that is, the surfactant used to form a seed latex particle, is a branched alkyl diphenyl oxide disulfonate, where alkyl is at least 11, at least 12, at least 13 or greater such as, sodium branched dodecyl diphenyloxide disulfonate, available commercially as CALFAX DB45™ of Pilot Chem, an initiator then is fed to the reactor at a rate not exceeding over 7.5 minutes and the mixture incubated to enable formation of resin seed particles of smaller size and/or comprising uniform populations of particles.

Initiator yields free radicals to promote emulsion polymerization of monomers within micelles so that monomers, such as, styrene and acrylate, chemically link together via covalent bonds. It is known feed rate of an initiator, combined with agitation speed, determine how fast and how homogenously free radicals may be dispersed into every micelle in solution, which influences growth of seed particles.

In embodiments, initiator is metered into a monomer mixture rather than added altogether, at once, in a bolus and so on, to ensure even dispersion of initiator in solution and to maximize exposure of monomer to initiator, for example, to reduce extreme concentration gradients in the mixture, to ensure maximal access of monomer to initiator and so on, to facilitate regular and thorough polymerization of monomer to form polymer, to obtain uniform populations of smaller sized resin seed particles in an efficient manner, for example, with minimal reaction time and maximal yield.

In the present disclosure, using lower amounts of seed surfactant, seed particle size surprisingly is stable despite initiator amount and initiator addition rate. As such, the instant disclosure demonstrates flow rate of an initiator solution is not a source of variation of seed particle size, thereby affording a more robust EP process for making smaller sized seed particle in a forgiving and reproducible fashion.

Uniform populations of smaller seed particles are formed independent of initiator amount, although lower amounts of initiator likely are used to minimize unwanted and/or excessive polymerization of polymers, for example, to minimize branching, networking and the like. The process of interest provides smaller sized particles, uniform populations of particles or both even when the rate of initiator addition varies by about 350%, by about 400%, by about 450% or more, based on initiator solution flow rate, for example, ml per min, although the units will vary depending on the size or volume of the reaction, for example, dl/min, liters/min and so on.

The resulting seed particles are smaller sized than when obtained using a surfactant different from a branched alkyl diphenyl oxide disulfonate and optionally, a different process. Smaller particles can be beneficial in forming smaller sized latex particles. Smaller sized latex particles can be beneficial in making toner. Hence, the $D_{50}$ size of seed particles of interest can be less than about 70 nm, less than about 69 nm, less than about 68 nm or smaller.

The seed particles comprise uniform populations of particles indicative of uniform polymerization of monomer, that is, suitable polymerization starts from a number of monomers, with suitable monomer concentration to produce polymers of suitable size. The lower levels of size variability of the seed particles can be manifest as a range of standard deviations about a mean value, small ranges of sizes about a mean and so on. Populations of interest vary in size from about ±0.5 nm to about ±5 nm, from about ±0.5 nm to about ±4.5 nm, from about 0.5 nm to about 0.4 nm or with smaller or lesser variability about a population mean value.

Unless otherwise indicated, all numbers expressing quantities and conditions, and so forth used in the specification and claims are to be understood as being modified in all instances by the term, “about,” unless one value is not modified by, “about,” and others in the phrase, clause or sentence are modified by, “about.” “About,” is meant to indicate a variation of no more than 10% from the stated value. Also used herein is the term, “equivalent.” “similar,” “essentially,” “substantially,” “approximating,” and, “matching,” or grammatic variations thereof, have generally acceptable definitions or at the least, are understood to have the same meaning as, “about.”

As used herein, “optimal feed rate,” is a rate at which a material is charged into a container, for example, using unit volume/unit time, that results in a latex particle having favorable characteristics with respect to size, shape and the like, where such rate would be apparent to or determinable by one of skill in the art.

By, “two dimension,” or grammatic forms thereof, such as, 2-D, is meant to relate to a structure or surface that is substantially without measurable or discernible depth, without use of a mechanical measuring device. Generally, the surface is identified as flat, and emphasizes height and width, and lacks the illusion of depth or thickness. Thus, for example, toner is applied to a surface to form an image or coating and generally, that layer of fused toner is from about 1 μm to about 10 μm in thickness. Nevertheless, that application of toner to a flat surface is considered herein as a two dimensional application. The surface can be a sheet or a paper, for example. This definition is not meant to be a mathematic or scientific definition at the molecular level but one which to the eye of the viewer or observer, there is no illusion of thickness. A thicker layer of toner, such as one which might be identified as providing, “raised lettering,” on a surface, is for the purposes herein, included in the definition of 2-D.

By, “three dimension,” or grammatic forms thereof, such, as, 3-D, is meant to relate to a structure composed of plural layers or particle depositions of toner that aggregate or assemble to yield a form, a shape, a construct, an object and the like that, for example, need not be applied to a surface or structure, can be autonomous and/or has a thickness or depth. Printing as used herein includes producing 3-D structures. Printing on a surface or structure also is used herein to include forming a 3-D structure by deposition of plural layers of toner. Often, the first layer is printed on a support, surface, substrate, structure and so on. Successive layers of toner are placed thereon and the already deposited (and optionally adhered or solidified) toner layer or layers is considered herein a surface or a substrate.

A polymer can be identified or named herein by the one or more of the constituent monomers used to construct the polymer, even though following polymerization, a monomer is altered and no longer is identical to the original reactant. Thus, for example, a polyester often is composed of a polyacid monomer or component and a polyalcohol monomer or component. Accordingly, if a trimellitic acid reactant is used to make a polyester polymer, that resulting polyester polymer can be identified herein as a trimellitic polyester. A monomer is a reagent for producing a polymer and thus, is a constituent and integral part of a polymer, contributing to the backbone or linear arrangement of chemical entities covalently bound to form a chain of chemical moieties and that comprise a polymer.

Vessels may include, but are not limited to, a laboratory scale vessel or reactor, a 300 gallon jacketed stainless steel reactor with double flight impellers (a four pitched-blade impellor), tanks offered by Pope (Pope Scientific Inc., Saukville, Wis.), industrial production tanks and so on, without limitation.

Latex

Any resin may be utilized in forming a latex of the present disclosure. In the event a resin is crosslinked, any crosslinkable resin may be utilized. Such resins, in turn, may be made of any suitable monomer including one which can serve as a branching agent.

In embodiments, resins may be an amorphous resin, a crystalline resin or combination thereof, see for example, U.S. Pat. No. 6,830,860, the entire disclosure of which hereby is incorporated by reference in entirety. In embodiments, a polymer utilized to form a resin may be a polyester resin, including the resins described in U.S. Pat. Nos. 6,593,049 and 6,756,176, the entire disclosure of each of which hereby is incorporated by reference in entirety.

Example of monomers include a styrene, an acrylate, a methacrylate, a butadiene, an isoprene, and optionally acid or basic olefinic monomers, such as, an acrylic acid, a methacrylic acid, an acrylamide, an acrylonitrile, a polyol, a polyacid, a polyamine, a polyester, a methacrylamide, a quaternary ammonium halide of a dialkyl or a trialkyl acrylamide or methacrylamide, a vinylpyridine, a vinylpyrrolidone, a vinyl-N-methylpyridinum chloride and the like, and mixtures thereof. Presence of acid or basic groups in the monomers is optional, and such groups can be present in various amounts of from, for example, about 0.1 to about 10% by weight of a polymer resin. In embodiments, a monomer includes a mixture of styrene and acrylate monomers such that the polymer is a styrene acrylate.

In embodiments, a resin may be a polyester resin formed by reacting a polyol with a polyacid, optionally in presence of a catalyst.

For forming a crystalline polyester, suitable polyols include aliphatic diols with from about 2 to about 36 carbon atoms, such as, 1,2-ethanediol, 1,3-propanediol, 1,4-butanediol, 1,5-pentanediol, 1,6-hexanediol, 1,7-heptanediol, 1,8-octanediol, 1,9-nonanediol, 1,10-decanediol, 1,12-dodecanediol and the like. The aliphatic polyol may be in an amount of from about 40 to about 60 mole %.

Examples of polyacids or polyesters for a crystalline resin include vinyl polyacids or vinyl polyesters as well as oxalic acid, succinic acid, glutaric acid, adipic acid, suberic acid, azelaic acid, sebacic acid, fumaric acid, dimethyl fumarate, dimethyl itaconate, cis-1,4-diacetoxy-2-butene, diethyl fumarate, diethyl maleate, phthalic acid, isophthalic acid, terephthalic acid, naphthalene-2,6-dicarboxylic acid, naphthalene-2,7-dicarboxylic acid, cyclohexane dicarboxylic acid, malonic acid and mesaconic acid, a polyester, or anhydride thereof, or mixtures thereof. Polyacid may be selected in an amount of, for example, from about 40 to about 60 mole %.

Examples of crystalline resins include polyesters, polyamides, polyimides, polyolefins, polyethylene, polybutylene, polyisobutyrate, ethylene-propylene copolymers, ethylene-vinyl acetate copolymers, polypropylene, mixtures thereof, and the like. Specific crystalline resins may be polyester based, such as poly(ethylene-adipate), poly(propylene-adipate), poly(butylene-adipate), poly(pentylene-adipate), poly(hexylene-adipate), poly(octylene-adipate), poly(ethylene-succinate), poly(propylene-succinate), poly(butylene-succinate), poly(pentylene-succinate), poly(hexylene-succinate), poly(octylene-succinate), poly(ethylene-sebacate), poly(propylene-sebacate), poly(butylene-sebacate), poly(pentylene-sebacate), poly(hexylene-sebacate) or poly(octylene-sebacate). Examples of polyamides include poly(ethylene-adipamide), poly(propylene-adipamide), poly(butylene-adipamide), poly(pentylene-adipamide), poly(hexylene-adipamide), poly(octylene-adipamide), poly(ethylene-succinamide) and poly(propylene-sebacamide). Examples of polyimides include poly(ethylene-adipimide), poly(propylene-adipimide), polybutylene-adipimide), poly(pentylene-adipimide), poly(hexylene-adipimide), poly(octylene-adipimide), poly(ethylene-succinimide), poly(propylene-succinimide) and poly(butylene-succinimide).

Suitable crystalline resins include those disclosed in U.S. Publ. No. 2006/0222991, the entire disclosure of which hereby is incorporated by reference in entirety. In embodiments, a suitable crystalline resin may include a resin composed of ethylene glycol and a mixture of dodecanedioic acid and fumaric acid co-monomers with the following formula (11):

(II)

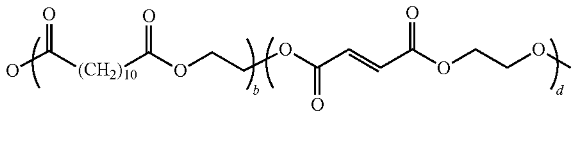

wherein b is from 5 to 2000 and d is from 5 to 2000.

A crystalline resin may be present, for example, in an amount of from about 5 to about 50% by weight of toner components. A crystalline resin can possess various melting points of, for example, from about 30° C. to about 120° C. A crystalline resin may have a number average molecular weight ($M_n$), as measured by gel permeation chromatography (GPC) of, for example, from about 1,000 to about 50,000, and a weight average molecular weight ($M_w$) of, for example, from about 2,000 to about 100,000. Molecular weight distribution ($M_w/M_n$) of a crystalline resin may be, for example, from about 2 to about 6.

Examples of polyacids or polyesters, including vinyl polyacids or vinyl polyesters, selected for preparation of amorphous polyesters include polycarboxylic acids or polyesters, such as, terephthalic acid, phthalic acid, isophthalic acid, fumaric acid, dimethyl fumarate, dimethyl itaconate, cis-1,4-diacetoxy-2-butene, diethyl fumarate, diethyl maleate, maleic acid, succinic acid, itaconic acid, succinic acid, succinic anhydride, dodecylsuccinic acid, dodecylsuccinic anhydride, glutaric acid, glutaric anhydride, adipic acid, pimelic acid, suberic acid, azelaic acid, dodecanediacid, dimethyl terephthalate, diethyl terephthalate, dimethylisophthalate, diethylisophthalate, dimethylphthalate, phthalic anhydride, diethylphthalate, dimethyl succinate, dimethyl fumarate, dimethylmalcate, dimethylglutarate, dimethyladipate, dimethyl dodecylsuccinate and combinations thereof. The polyacid or polyester may be present in an amount from about 40 to about 60 mole % of a resin.

Examples of polyols utilized in generating an amorphous polyester include 1,2-propanediol, 1,3-propanediol, 1,2-butanediol, 1,3-butanediol, 1,4-butanediol, pentanediol, hexanediol, 2,2-dimethylpropanediol, 2,2,3-trimethylhexanediol, heptanediol, dodecanediol, 1,4-cyclohexanedimethanol, 1,3-cyclohexanedimethanol, xylenedimethanol, cyclohexanediol, diethylene glycol, bis(2-hydroxyethyl) oxide, dipropylene glycol, dibutylene and combinations thereof. The amount of polyol selected can vary, and may be present, for example, in an amount from about 40 to about 60 mole % of a resin.

Polycondensation catalysts which may be utilized for making either a crystalline or amorphous polyester include tetraalkyl titanates, dialkyltin oxides, such as, dibutyltin oxide, tetraalkyltins, such as, dibutyltin dilaurate, and dialkyltin oxide hydroxides, such as, butyltin oxide hydroxide, aluminum alkoxides, alkyl zinc, dialkyl zinc, zinc oxide, stannous oxide or combinations thereof. Such catalysts may be utilized in amounts of, for example, from about 0.01 mole % to about 5 mole % based on starting polyacid or polyester used to generate the polyester resin.

In embodiments, suitable amorphous resins include polyesters, polyamides, polyimides, polyolefins, polyethylene, polybutylene, polyisobutyrate, ethylene-propylene copolymers, ethylene-vinyl acetate copolymers, polypropylene, combinations thereof and the like. Examples of amorphous resins which may be utilized include poly(styrene-acrylate) resins, crosslinked, for example, from about 10% to about 70%, poly(styrene-acrylate) resins, poly(styrene-methacrylate) resins, crosslinked poly(styrene-methacrylate) resins, poly(styrene-butadiene) resins or crosslinked poly(styrene-butadiene) resins.

Examples of other suitable resins or polymers which may be utilized include, but are not limited to, poly(styrene-butadiene), poly(methylstyrene-butadiene), poly(methyl methacrylate-butadiene), poly(ethyl methacrylate-butadiene), poly(propyl methacrylate-butadiene), poly(butyl methacrylate-butadiene), poly(methyl acrylate-butadiene), poly(ethyl acrylate-butadiene), poly(propyl acrylate-butadiene), poly(butyl acrylate-butadiene), poly(styrene-isoprene), poly(methylstyrene-isoprene), poly(methyl methacrylate-isoprene), poly(ethyl methacrylate-isoprene), poly(propyl methacrylate-isoprene), poly(butyl methacrylate-isoprene), poly(methyl acrylate-isoprene), poly(ethyl acrylate-isoprene), poly(propyl acrylate-isoprene), poly(butyl acrylate-isoprene), poly(styrene-propyl acrylate), poly(styrene-butyl acrylate), poly(styrene-butadiene-acrylic acid), poly(styrene-butadiene-methacrylic acid), poly(styrene-butadiene-acrylonitrile-acrylic acid), poly(styrene-butyl acrylate-acrylic acid), poly(styrene-butyl acrylate-methacrylic acid), poly(styrene-butyl acrylate-acrylonitrile), poly(styrene-butyl acrylate-acrylonitrile-acrylic acid), poly(styrene-alkyl acrylate), poly(styrene-1,3-diene), poly(styrene-alkyl methacrylate), poly(styrene-alkyl acrylate-acrylic acid), poly(styrene-1,3-diene-acrylic acid), poly(styrene-alkyl methacrylate-acrylic acid), poly(alkyl methacrylate-alkyl acrylate), poly(alkyl methacrylate-aryl acrylate), poly(aryl methacrylate-alkyl acrylate), poly(alkyl methacrylate-acrylic acid), poly(styrene-alkyl acrylate-acrylonitrile-acrylic acid), poly(styrene-1,3-diene-acrylonitrile-acrylic acid), poly(alkyl acrylate-acrylonitrile-acrylic acid and combinations thereof.

A polymer may be block, random or alternating copolymer.

In embodiments, a resin is a crosslinked or a crosslinkable resin. A crosslinkable resin comprises a crosslinkable group, such as, a C═C bond. A resin can be crosslinked, for example, through a free radical polymerization with an initiator. In embodiments, an unsaturated polyester resin may be utilized as a latex resin, such as those disclosed in U.S. Pat. No. 6,063,827, the entire disclosure of which hereby is incorporated by reference in its entirety.

Crosslinking monomers which may be incorporated into a polymer include divinylbenzene or diethylene glycol methacrylate. Crosslinking monomer(s) may be included in amounts, for example from about 1 to about 20% by weight of a polymer resin, depending on the desired degree of crosslinking.

Exemplary unsaturated polyester resins include, but are not limited to, poly(1,2-propylene fumarate), poly(1,2-propylene maleate), poly(1,2-propylene itaconate) and combinations thereof.

In addition, chain transfer agents, for example, dodecanethiol (DDT), water soluble thiols, such as, butanethiol or propanethiol, or carbon tetrabromide, also may be included in a monomer emulsion to control molecular weight properties of a polymer. If present, chain transfer agent(s) may be included in amounts of, for example, about 1 to about 10% by weight of a polymer resin.

In embodiments, a branching agent optionally is included to control branching structure of a latex. Exemplary branching agents include, but are not limited to, decanediol diacrylate (ADOD), trimethylolpropane, pentaerythritol, trimellitic acid, pyromellitic acid and mixtures thereof. Based on total weight of monomers to be polymerized, a branching agent may be present in an amount from about 0% to about 2%, although may be present in greater or lesser amounts.

Process for Making Seed Particles

An EP process is known, several U.S. patents describe suitable methods, for example, U.S. Pat. No. 5,853,943, incorporated herein by reference in entirety.

In embodiments, a resin emulsion is provided to form a latex. In embodiments, formation of suitably sized resin particles comprises producing resin seed particles for later latex formation by exposure of the seed particles to additional one or more resin monomers.

As a surfactant selected for preparation of a seed particle, the surfactant (herein identified as, "seed surfactant") comprises a branched alkyl diphenyl oxide disulfonate. As provided above, the seed surfactant comprises one or two branched alkyl groups, each at least 11 carbons in size.

Examples of surfactants that can be used to form any dispersion or emulsion include sodium hexyl diphenyloxide disulfonate, sodium n-decyl diphenyloxide disulfonate, sodium n-dodecyl diphenyloxide disulfonate, sodium n-hexadecyl diphenyloxide disulfonate, sodium palmityl diphenyloxide disulfonate, n-decyl diphenyloxide disulfonic acid, n-dodecyl diphenyloxide disulfonic acid and tetrapropyl diphenyloxide disulfonic acid. Other surfactants include diphenyloxide disulfonates, such as, DOWFAX 2A1™, DOWFAX 3A2™, DOWFAX 8390™ available Dow Chemical, RHODACAL DSB™ available from Rhone-Poulenc, POLY-TERGENT 2A1™, POLY-TERGENT 2EP™ available from Olin, AEROSOL DPOS-45™ available from Cytec, and CALFAX DBA-40™, CALFAX 16L-35™ or CALFAX DB-45™ available from Pilot Chemicals and the like. In an aspect, the seed surfactant is CALFAX DB-45™.

In embodiments, the seed surfactant is used in portions, which may be exposed to monomer present in separate vessels in a polymerization process. For example, a seed surfactant may be prepared in a solution, for example, of deionized water (DIW) in a reactor. In a separate vessel, monomer and any other reagent of interest are combined with a seed surfactant, which may be the same or different from the seed surfactant in solution in the reactor. The monomer solution then is added to the reactor containing the seed surfactant solution and mixed. Initiator is added to the mixed solution to form seed particles. In embodiments, an aliquot of the mixture in the reactor is removed to a third vessel and initiator added to the third vessel to form seed particles. In embodiments, seed surfactant is present in a greater amount in the vessel comprising a monomer emulsion (i.e., pre-emulsion vessel) than in the vessel or reactor containing the seed surfactant solution, to which the monomer emulsion is added. In aspects, the amount of seed surfactant in the pre-emulsion vessel is about 2 fold, about 3 fold, about 4 fold, about 5 fold or more greater than the amount in the reactor vessel as a surfactant solution. In embodiments, the ratio of seed surfactant in the reactor vessel:pre-emulsion vessel is about 20:80, about 19:81, about 18:82, about 17:81 or lower. The two seed surfactants used to make the solution in the reactor and that mixed with the monomer(s) can be the same or different.

Initiators

In embodiments, an initiator is added for formation of a latex, such as, forming a seed particle. Examples of suitable initiators include water soluble initiators, such as, ammonium persulfate (APS), sodium persulfate and potassium persulfate, and organic soluble initiators including organic peroxides and azo compounds including Vazo peroxides, such as, VAZO 64™, 2-methyl 2-2'-azobis propanenitrile, VAZO 88™, 2-2'-azobis isobutyramide dehydrate and combinations thereof. Other water-soluble initiators which may be utilized include azoamidine compounds, for example 2,2'-azobis(2-methyl-N-phenylpropionamidine)dihydrochloride, 2,2'-azobis[N-(4-chlorophenyl)-2-methylpropionamidine]dihydrochloride, 2,2'-azobis[N-(4-hydroxyphenyl)-2-methylpropionamidine]dihydrochloride, 2,2'-azobis [N-(4-amino-phenyl)-2-methylpropionamidine] tetrahydrochloride, 2,2'-azobis[2-methyl-N(phenylmethyl) propionamidine]dihydrochloride, 2,2'-azobis[2-methyl-N-2-propenylpropionamidine]dihydrochloride, 2,2'-azobis[N-(2-hydroxy-ethyl)2-methylpropionamidine]dihydrochloride, 2,2'-azobis[2-(5-methyl-2-imidazolin-2-yl)propane]dihydrochloride, 2,2'-azobis[2-(2-imidazolin-2-yl)propane]dihydrochloride, 2,2'-azobis-[2-(4,5,6,7-tetrahydro-1H-1,3-diazepin-2-yl)propane]dihydrochloride, 2,2'-azobis[2-(3,4,5,6-tetrahydropyrimidin-2-yl)propane]dihydrochloride, 2,2'-azobis[2-(5-hydroxy-3,4,5,6-tetrahydropyrimidin-2-yl) propane]dihydrochloride, 2,2'-azobis[2-[1-(2-hydroxyethyl)-2-imidazolin-2-yl]propane]dihydrochloride, 2,2'-azobis 2-(2-imidazolin-2-yl)propane disulfate dehydrate, 2,2'-azobis[2-(2-imidazolin-2-yl)propane], 2,2'-azobis (1-imino-1-pyrrolidino-2-ethylpropane)dihydrochloride, 2,2'-azobis[2-methyl-N-(2-hydroxyethyl)propionamide] combinations thereof and the like.

Initiators can be added in suitable amounts, such as, from about 0.01 to about 3 weight %, from about 0.1 to about 2 weight % of monomers. The initiator, if water soluble, is dissolved in water, such as, DIW, for ready access of initiator to monomer. Initiator can be dissolved in a liquid in an amount from about 15 wt % to about 50 wt %, from about 15 wt % to about 40 wt %, from about 15 wt % to about 30 wt %. In embodiments, initiator, when in a solution, is added to monomer at a rate of less than about 35 ml/min, less than about 30 ml/min, less than about 25 ml/min, less than about 20 ml/min. In embodiments, initiator is added over a period of time of less than 7.5 minutes, less than 7 min, less than about 6.5 min, less than about 6 min, less than about 5.5 min. less than about 5 min, less than about 4.5 min, less than about 4 min, less than about 3.5 min, less than about 3 min, less than about 2.5 min, less than about 2 min.

As provided above, generally, initiator is not added to a monomer mixture all at once, not in a bolus and not too rapidly to ensure maximal exposure of monomer to initiator for even and regular polymerization, in embodiments, of essentially linear polymer with minimal branching. As another means to ensure rapid dispersion of initiator in the monomer mixture, the monomer mixture can be agitated, stirred, mixed, homogenized and the like.

Once initiator is added, the mixture is incubated, optionally, at an elevated temperature, optionally, under a vacuum, optionally, with stirring, optionally, under an inert environment and the like to enable polymerization and seed particle formation. The incubation is continued until seed particles of desired size are attained. The reaction then is halted, for example, by removing or terminating polymerization conditions, washing the particles and so on.

Once the seed particle emulsion is prepared, an aliquot thereof can be removed to a new reactor or vessel to which is added additional monomer, optionally, a branching agent, optionally, an initiator, optionally, a surfactant and/or other reagent(s) as a design choice to produce resin particles, that is, a latex. The reaction mixture is incubated, optionally, at an elevated temperature, optionally, under vacuum, optionally, under an inert environment and so on as a design choice to produce resin particles of particular size for a desired use, such as, greater than about 100 nm, greater than about 120 nm, greater than about 140 nm or larger.

Toner

The resulting latex then may be utilized to form toner by any method within the purview of those skilled in the art. A latex emulsion may be contacted with an optional colorant, optionally in a dispersion, and other additives to form a toner by a suitable process, in embodiments, an emulsion aggregation (EA) and coalescence process.

Colorant

One or more colorants may be added, and various known suitable colorants, such as dyes, pigments, mixtures of dyes, mixtures of pigments, mixtures of dyes and pigments, and the like, may be included in a toner. In embodiments, colorant, when present, may be included in the toner in an amount of, for example, 0 (clear or colorless) to about 35% by weight of the toner, although the amount of colorant can be outside of that range.

As examples of suitable colorants, mention may be made of carbon black like REGAL 330® (Cabot), Carbon Black 5250 and 5750 (Columbian Chemicals), Sunsperse Carbon Black LHD 9303 (Sun Chemicals); magnetites, such as Mobay magnetites MO8029™, MO8060™; Columbian magnetites; MAPICO BLACKS™ and surface treated magnetites; Pfizer magnetites CB4799™, CB5300™, CB5600™, MCX6369™; Bayer magnetites, BAYFERROX 8600™, 8610™; Northern Pigments magnetites, NP-604™, NP-608™; Magnox magnetites TMB-100™ or TMB-104™; and the like.

Also, cyan, magenta, yellow, red, green, brown, blue, other colors or mixtures thereof can be selected as a colorant.

Wax

Optionally, a wax also may be combined with resin and an optional colorant in forming toner particles. Wax may be provided in a wax dispersion, which may include a single type of wax or a mixture of two or more different waxes.

When included, wax may be present in an amount of, for example, from about 1% by weight to about 25% by weight of the toner particles, although the amount of wax can be outside of that range. Waxes may have an average molecular weight of from about 500 to about 20,000.

Waxes that may be used include, for example, polyolefins, such as, polyethylenes including linear polyethylene waxes and branched polyethylene waxes, polypropylenes including linear polypropylene waxes and branched polypropylene waxes, polyethylene/amides, polyethylenetetrafluoroethylenes, polyethylenetetrafluoroethylene/amides, naturally occurring waxes, such as, those obtained from plant sources or animal sources, and polybutene waxes. Mixtures and combinations of the foregoing waxes also may be used, in embodiments. In embodiments, waxes may be crystalline or non-crystalline.

Toner Preparation

Toner particles may be prepared by any method within the purview of one skilled in the art. Although embodiments relating to toner particle production are described below with respect to EA processes, any suitable method of preparing toner particles may be used, including, chemical processes, such as, suspension and encapsulation processes disclosed in U.S. Pat. Nos. 5,290,654 and 5,302,486, the entire disclosure of each of which hereby is incorporated by reference in entirety.

In embodiments, toner compositions may be prepared by EA processes, such as, a process that includes aggregating a mixture of a resin, an optional colorant, an optional wax and any other desired or required additives, optionally with a surfactant as described above, and then coalescing the aggregated particles. A mixture for making particles may be prepared by adding a colorant and optionally a wax or other materials, which optionally may be in a dispersion(s) including a surfactant, to a resin emulsion, which may be a mixture of two or more emulsions containing a resin. The pH of the resulting mixture may be adjusted by an acid such as, for example, acetic acid, nitric acid or the like to from about 2 to about 5. Additionally, in embodiments, a mixture may be homogenized, for example, at from about 600 to about 6,000 rpm, using, for example, an IKA ULTRA TURRAX T50.

Following preparation of the above mixture, an aggregating agent may be added to the mixture. Any suitable aggregating agent may be utilized to form a toner. Suitable aggregating agents include, for example, aqueous solutions of a polyvalent cation. An aggregating agent may be, for example, an inorganic cationic aggregating agent, such as, polyaluminum halides, such as, polyaluminum chloride (PAC), a corresponding bromide, fluoride or iodide, polyaluminum silicates, such as, polyaluminum sulfosilicate (PASS), and water soluble metal salts, including aluminum chloride, aluminum nitrite, aluminum sulfate, potassium aluminum sulfate, calcium acetate, calcium chloride, calcium nitrite, calcium oxylate, calcium sulfate, magnesium acetate, magnesium nitrate, magnesium sulfate, zinc acetate, zinc nitrate, zinc sulfate, zinc chloride, zinc bromide, magnesium bromide, copper chloride, copper sulfate and combinations thereof. An aggregating agent may be added to a mixture at a temperature that is below a $T_g$ of a resin.

An aggregating agent may be added in an amount of, for example, from about 0.1% to about 10% by weight of the resin in the mixture.

Particles are permitted to aggregate until a desired particle size is attained. Particle size can be monitored, for example, with a COULTER COUNTER, for average particle size. Aggregation may proceed by maintaining an elevated temperature or slowly raising temperature to, for example, from about 40° C. to about 100° C., and holding a mixture at an elevated temperature from about 0.5 hrs to about 6 hrs, while maintaining stirring, to provide aggregated particles.

Once a desired final size of toner particles is achieved, pH of the mixture may be adjusted with a base or a buffer to a value of from about 3 to about 10. Adjustment of pH may be utilized to freeze, that is, to stop, toner particle growth. Base utilized to stop toner growth may include, for example, alkali metal hydroxides, such as, for example, sodium hydroxide, potassium hydroxide, ammonium hydroxide, combinations thereof and the like. In embodiments, a compound, such as, ethylene diamine tetraacetic acid (EDTA) or a compound with equivalent properties, may be added to help adjust pH to the desired values noted above.

Shell Resin

In embodiments, after aggregation, but prior to coalescence, a resin coating may be applied to the aggregated particles to form a shell thereover. In embodiments, a core thus may include an amorphous resin and/or a crystalline resin, as described above. Any resin described above or as known in the art may be utilized as a shell.

A shell resin may be applied to core particles by any method within the purview of those skilled in the art. In embodiments, resins may be in an emulsion, including any surfactant described above. Formation of a shell over the aggregated, core particles may occur while heating to a temperature of from about 30° C. to about 80° C., for a period of time of from about 5 min to about 10 hr.

A shell may be present in an amount of from about 10% by weight to about 40% by weight of toner particles.

Coalescence

Following aggregation to desired particle size and application of any optional shell, particles may be coalesced to desired final shape, coalescence being achieved by, for example, heating the particles to a temperature of from about 45° C. to about 100° C., which may be at or above the $T_g$ of resin(s) in the toner particles. Coalescence may be accomplished over a period of from about 0.01 to about 9 hrs.

After aggregation and/or coalescence, the toner particle mixture may be cooled to room temperature (RT), such as, from about 20° C. to about 25° C. Cooling may be rapid or slow, as desired. A suitable cooling method may include introducing cold water to a jacket around a reactor. After cooling, toner particles may be washed with water and then dried.

In embodiments, final size of toner particles may be less than about 8 μm, less than about 7 μm, less than about 6 μm in size or smaller.

Additives

In embodiments, toner particles may contain optional additives. For example, toner may include positive or negative charge control agents, for example, in an amount of from about 0.1 to about 10% by weight of a toner. Examples of suitable charge control agents include quaternary ammonium compounds inclusive of alkyl pyridinium halides; bisulfates; alkyl pyridinium compounds, including those disclosed in U.S. Pat. No. 4,298,672, the entire disclosure of which hereby is incorporated by reference in entirety; organic sulfate and sulfonate compositions, including those disclosed in U.S. Pat. No. 4,338,390, the entire disclosure of which hereby is incorporated by reference in entirety; cetyl pyridinium tetrafluoroborates; distearyl dimethyl ammonium methyl sulfate, aluminum salts, such as, BONTRON E84™ or E88™ (Orient Chemical Industries, Ltd.); combinations thereof and the like.

There also can be blended with toner particles, external additives including flow aid additives, which additives may be present on or at the surface of toner particles. Examples of additives include metal oxides, such as, titanium oxides, silicon oxides, aluminum oxides, cerium oxides, tin oxides, mixtures thereof and the like; colloidal and amorphous silicas, such as, AEROSIL®, metal salts and metal salts of fatty acids inclusive of zinc stearate and calcium stearate, or of long chain alcohols, such as, UNILIN 700, and mixtures thereof. Suitable additives include those disclosed in U.S. Pat. Nos. 3,590,000, 3,800,588 and 6,214,507, the entire disclosure of each of which hereby is incorporated by reference in entirety.

Each external additive may be present in an amount of from about 0.1% by weight to about 5% by weight of a toner, although the amount of additives can be outside of that range.

In embodiments, the dry toner particles having a shell of the present disclosure may, exclusive of external surface additives, have the following characteristics: (1) volume average diameter (also referred to as, "volume average particle diameter,") of from about 3 to about 25 μm; (2) number average geometric size distribution ($GSD_n$) and/or volume average geometric size distribution ($GSD_v$) of from about 1.05 to about 1.55; and (3) circularity of from about 0.93 to about 1 (as measured with, for example, a Sysmex FPIA 2100 analyzer).

The characteristics of toner particles may be determined by any suitable technique and apparatus, such as, a Beckman Coulter MULTISIZER 3.

Developers

Toner particles may be formulated into a two component developer composition by mixing with carrier particles. Toner concentration in a developer may be from about 1% to about 25% by weight of the total weight of developer, with the remainder being carrier. However, different toner and carrier percentages may be used to achieve a developer composition with desired characteristics.

Carriers

Examples of carrier particles for mixing with toner particles include particles that triboelectrically obtain a charge of polarity opposite to that of the toner particles. Illustrative examples of suitable carrier particles include granular zircon, granular silicon, glass, steel, nickel, ferrites, iron ferrites, silicon dioxide, one or more polymers and the like. Other carriers include those disclosed in U.S. Pat. Nos. 3,847,604; 4,937,166; and 4,935,326.

In embodiments, carrier particles may include a core with a coating thereover, which may be formed from a polymer or a mixture of polymers that are not in close proximity thereto in the triboelectric series, such as, those as taught herein, or as known in the art. Coating may include fluoropolymers, terpolymers of styrene, silanes and the like. A coating may have a weight of, for example, from about 0.1 to about 10% by weight of a carrier.

Various means can be used to apply a polymer to a surface of a carrier core, for example, cascade roll mixing, tumbling, milling, shaking, electrostatic powder cloud spraying, fluidized bed mixing, electrostatic disc processing, electrostatic curtain processing and the like. A mixture of carrier core particles and polymer, for example, as a liquid or as a powder, then may be heated to enable polymer to melt and to fuse to the carrier core. Coated carrier particles then may be cooled and thereafter classified to a desired particle size.

Imaging and Manufacturing Devices

Toners may be used for electrostatographic or electrophotographic processes, including those disclosed in U.S. Pat. No. 4,295,990, the entire disclosure of which herein is incorporated by reference in entirety. In embodiments, any known type of image development system may be used in an image developing device, including, for example, magnetic brush development, jumping single component development, hybrid scavengeless development (HSD) and so on. Those and similar development systems are within the purview of those skilled in the art.

Color printers commonly use one to four, or more housings carrying different colors to generate full color images based on black plus the standard printing colors, cyan, magenta and yellow. However, in embodiments, additional housings may be desirable, including image generating devices possessing five housings, six housings or more, thereby providing additional toner colors to print an extended range of colors (extended gamut) and to provide a clear coat or coating.

3D printers (including those disclosed in U.S. Pat. Nos. 5,204,055; 7,215,442; and 8,289,352) or any other type of printing apparatus that is capable of applying and fusing a toner on a substrate or to form an article of manufacture. Thermoplastic and thermosetting styrene and acrylate polymers can be used for 3-D printing by any of a variety of materials and methods, such as, selective heat sintering, selective laser sintering, fused deposition modeling, robocasting and so on. A resin can be formed into sheets for use in laminated object manufacturing. In embodiments, a resin is configured as a filament. Granular resin can be used in selective laser melting methods. Inkjet devices can deliver resin.

Examples of polymers include acrylonitrile butadiene styrene, polyethylene, polymethylmethacrylate, polystyrene and so on. In embodiments, polymers can be mixed with an adhesive to promote binding. In embodiments, an adhesive layer is interleaved with a layer of cured or hardened polymer to bind leafs or layers.

A polymer may be configured to contain a compound that on exposure to a stimulant decomposes and forms one or more free radicals which promote polymerization of a polymer of interest, such as, forming branches, networks and covalent bonds. For example, a polymer can comprise a photoinitiator to induce curing on exposure to white light, an LED, UV light and so on. Such materials can be used in stereolithography, digital light processing, continuous liquid interface production and so on.

Waxes and other curing material can be incorporated into a 3-D-forming composition or can be provided as a separate composition for deposition on a layer of a resin of interest or between layers of a resin of interest.

For example, a selective laser sintering powder, such as, a polyacrylate or polystyrene, is placed in a reservoir atop of a delivery piston. Granular resin is transferred from the reservoir to the delivery piston to a second void comprising a fabrication piston which carries the transferred resin in the form of a thin layer. The thin layer then is bonded, for example, exposed to a light or a laser tuned to melt and to fuse selected sites of the layer of resin particles. A second layer of resin granules is added from the reservoir to the fabrication void onto the fused layer of toner on the fabrication piston and the laser again melts and fuses selected portions of the second or subsequent layer of granules. The heating and fusion is of an intensity and strength to enable heating and fusing of sites from the second layer to sites of the first layer, thereby forming a growing solid structure of defined shape in the vertical direction. In embodiments, an adhesive or binder is applied to the fused first layer before the unfused granular resin for the second layer is applied. When all of the layers are applied one on another and selected portions thereof are fused or bonded and hence, completed, the unfused resin powder is removed from the multiple layers of fused toner leaving the fused granules in the form of a designed structure. Such a manufacturing method is an additive process as successive layers of a structure are laid down consecutively.

The subject matter now will be exemplified in the following non-limiting examples. Parts and percentages are by weight unless otherwise indicated. As used herein, RT refers to a temperature of from about 20° C. to about 30° C.

EXAMPLES

Example 1

A two liter reactor was charged with 14.9 g of CALFAX DB45 which was dissolved in 368 g of water at 72° C.

In another vessel, 2.7 g of ADOD, 5.41 g of DDT, 181.7 g of n-butyl acrylate (NBA), 591.4 g of styrene and 23.3 g of β-CEA are combined as the experimental monomer mixture. Multiple lots of experimental monomer mixture were made.

A control monomer mixture was prepared with the same reagents except that the CALFAX DB45 was replaced by DOWFAX 2A1.

An initiator solution was prepared by dissolving 11.6 g of APS in 57.3 g of DIW.

A monomer mixture is added to the 2 liter reactor containing the surfactant solution to form a mixture for making seed particles under a nitrogen environment.

An aliquot of 11.9 g was removed from the monomer mixture in the two liter reactor and was charged into another reactor within two (2) min to achieve a homogenous emulsion. The temperature was maintained at 72° C. for 10 min.

Then, APS solution was fed into the reactor. The same amount (68.9 g) of APS solution was used for each run, but APS was added at different flow rates (ranging from 7.5 to 31.5 ml/min, which translates to 1.64 to 6.87 g/min). Those rates translated to an initiator addition time ranging from 1.69 to 7.07 minutes. Since the flow rate between the slowest and fastest addition varied by about 420%, resulting in different feed times, at total of 40 min was used for each batch (including APS addition time and a hold time after APS addition).

Samples of the seed emulsions were obtained following initiator addition and the resulting particles measured by NANOTRAC for particle size determination. The results are presented in Table 1.

TABLE 1

Seed particle size as a function of APS addition rate

| Lot # | APS addition rate (ml/min) | APS addition rate (g/min) | Seed $D_{50}$ (nm) | Width (nm) |
|---|---|---|---|---|
| 1 | 15.8 | 3.45 | 67 | 34.2 |
| 1 | 31.5 | 6.87 | 64 | 32.7 |
| 2 | 15.8 | 3.45 | 67 | 33.2 |
| 2 | 31.5 | 6.87 | 62 | 35.5 |
| 3 | 7.5 | 1.64 | 64 | 35.5 |
| 3 | 7.5 | 1.64 | 64 | 28.5 |
| 4 | 7.5 | 1.64 | 62 | 29.8 |
| 4 | 15.8 | 3.45 | 66 | 30.8 |
| 4 | 31.5 | 6.87 | 66 | 32.4 |

Seed particle size, $D_{50}$, is stable and independent of APS feed rate from 7.5 to 31.5 ml/min, or 1.64 to 6.87 g/min. Particle width also was stable, suggesting that addition rate does not influence particle size distribution.

Example 2

Control seed particles were made as provided in Example 1 except for using DOWFAX as surfactant. The same amount of APS was used, which was added over the same range of times and rates.

An aliquot of seed particles from the experimental runs summarized in Table 1 and from control runs made using DOWFAX were taken from the respective reactions and then were exposed to additional monomer for a defined period of time and the reaction halted to obtain resin particles.

In one experiment, the CALFAX surfactant resulted in latex particles with a size of 148.5 nm and the DOWFAX surfactant produced particles 177.5 nm in size. The smaller seed particles resulted in smaller resin particles, which are desired for making toner.

It will be appreciated that various of the above-disclosed and other features and functions, or alternatives thereof, may be desirably combined into many other different systems or applications without departing from the spirit and scope of the disclosed subject matter. Also various presently unforeseen or unanticipated alternatives, modifications, variations or improvements therein may be subsequently made by those skilled in the art, which are also intended to be encompassed by the following claims. Unless specifically recited in a claim, steps or components of claims should not be implied or imported from the specification or any other claims as to any particular order, number, position, size, shape, angle, color or material.

The entire content of all references cited herein are incorporated by reference in the instant specification in entirety.

We claim:

1. A method of producing resin seed particles comprising:

(a) combining (i) water, (ii) an amount of a first branched alkyl diphenyl oxide disulfonate, (iii) a monomer, (iv) an optional branching agent and (v) an optional chain transfer agent in a vessel to form a monomer mixture;

(b) combining (i) water and (ii) an amount of a second branched alkyl diphenyl oxide disulfonate in a reactor to form a seed surfactant solution, wherein the amount of the first branched alkyl diphenyl oxide disulfonate in the vessel of step (a) is at least four times greater than the amount of the second branched alkyl diphenyl oxide disulfonate in the reactor of step (b);

(c) charging an aliquot of said monomer mixture into the reactor containing the seed surfactant solution; and (d) adding an initiator to said reactor containing the seed surfactant solution and the aliquot of the monomer mixture at an initiator adding rate to obtain resin seed particles, wherein the initiator adding rate varies by at least 350% during step (d), and further wherein the resin seed particles formed by step (d) are characterized by a D50 size and a deviation of the D50 size of no more than ±3 nm.

2. The method of claim 1, wherein the resin of said resin seed particles comprises poly(styrene-alkyl acrylate), poly(styrene-1,3-diene), poly(styrene-alkyl methacrylate), poly(styrene-alkyl acrylate-acrylic acid), poly(styrene-1,3-diene-acrylic acid), poly(styrene-alkyl methacrylate-acrylic acid), poly(alkyl methacrylate-alkyl acrylate), poly(alkyl methacrylate-aryl acrylate), poly(aryl methacrylate-alkyl acrylate), poly(alkyl methacrylate-acrylic acid), poly(styrene-alkyl acrylate-acrylonitrile-acrylic acid), poly(styrene-1,3-diene-acrylonitrile-acrylic acid), poly(alkyl acrylate-acrylonitrile-acrylic acid, poly(methyl styrene-butadiene), poly(methyl methacrylate-butadiene), poly(ethyl methacrylate-butadiene), poly(propyl methacrylate-butadiene), poly(butyl methacrylate-butadiene), poly(methyl acrylate-butadiene), poly(ethyl acrylate-butadiene), poly(propyl acrylate-butadiene), poly(butyl acrylate-butadiene), poly(styrene-isoprene), poly(methyl styrene-isoprene), poly(methyl methacrylate-isoprene), poly(ethyl methacrylate-isoprene), poly(propyl methacrylate-isoprene), poly(butyl methacrylate-isoprene), poly(methyl acrylate-isoprene), poly(ethyl acrylate-isoprene), poly(propyl acrylate-isoprene), poly(butyl acrylate-isoprene), poly(styrene-propyl acrylate), poly(styrene-butyl acrylate), poly(styrene-butadiene-acrylic acid), poly(styrene-butadiene-methacrylic acid), poly(styrene-butadiene-acrylonitrile-acrylic acid), poly(styrene-butyl acrylate-acrylic acid), poly(styrene-butyl acrylate-methacrylic acid), poly(styrene-butyl acrylate-acrylonitrile), poly(styrene-butyl acrylate-acrylonitrile-acrylic acid) or combinations thereof.

3. The method of claim 1, wherein said initiator is selected from the group consisting of potassium persulfate, ammonium persulfate (APS), sodium persulfate, 2,2'-azobis[2-(2-imidazolin-2-yl)propane]dihydrochloride, 2,2'-azobis[2-(2-imidazolin-2-yl)propane]disulfate dehydrate, 2,2'-azobis[2-[1-(2-hydroxyethyl)-2-imidazolin-2-yl]propane] dihydrochloride, 2,2'-azobis[2-(2-imidazolin-2-yl)propane], 2,2'-azobis(1-imino-1-pyrrolidino-2-ethylpropane)dihydrochloride, 2,2'-azobis[2-methyl-N-(2-hydroxyethyl)propionamide] and combinations thereof.

4. The method of claim 1, wherein said first and second branched alkyl diphenyl oxide disulfonates are each a branched dodecyl diphenyl oxide disulfonate.

5. The method of claim 4, wherein a ratio of the amount of the second branched alkyl diphenyl oxide disulfonate in the reactor to the amount of the first branched alkyl diphenyl oxide disulfonate in the vessel is in the range of from 20:80 to 17:82.

6. The method of claim 5, wherein said monomer mixture comprises a styrene and an acrylate.

7. The method of claim 6, wherein the ratio is 18:82.

8. The method of claim 1, wherein the resin of said resin seed particles comprises a polyester polymer.

9. The method of claim 1, further comprising incubating additional monomer with said resin seed particles formed by step (d) to obtain resin particles greater than about 100 nm in size.

10. The method of claim 1, wherein said first and second branched alkyl diphenyl oxide disulfonates are the same.

11. The method of claim 1, wherein said monomer mixture comprises decanediol diacrylate.

12. The method of claim 1, wherein said monomer mixture comprises dodecanethiol.

13. The method of claim 1, wherein said monomer mixture comprises a styrene and an acrylate.

14. The method of claim 1, wherein a ratio of the amount of the second branched alkyl diphenyl oxide disulfonate in the reactor to the amount of the first branched alkyl diphenyl oxide disulfonate in the vessel is in the range of from 20:80 to 17:82.

15. The method of claim 14, wherein the ratio is about 18:82.

16. The method of claim 1, wherein the initiator adding rate varies by at least 400% during step (d).

17. The method of claim 16, wherein the D50 size is less than 70 nm.

18. A method of making a toner comprising the method of claim 1 and further comprising (e) incubating additional monomer with said resin seed particles formed by step (d) to obtain resin particles;

(f) aggregating the resin particles to form aggregated particles;

(g) coalescing said aggregated particles to form toner particles; and (h) isolating the toner particles from step (g).

19. The method of claim 18, further comprising adding a shell to the aggregated particles of step (f).

* * * * *